United States Patent [19]
Balch et al.

[11] 3,985,052
[45] Oct. 12, 1976

[54] CONVEYOR LOADING SYSTEM

[75] Inventors: James L. Balch; James E. Anderson; Boleslaus J. Sadeski, all of Madison, Wis.

[73] Assignee: Oscar Mayer & Co. Inc., Madison, Wis.

[22] Filed: Jan. 8, 1976

[21] Appl. No.: 647,575

Related U.S. Application Data

[62] Division of Ser. No. 447,392, March 1, 1974, Pat. No. 3,941,234.

[52] U.S. Cl. .................................... 83/69; 83/79; 83/89; 83/92
[51] Int. Cl.² ...................... B26D 4/26; B26D 4/46; B26D 5/20
[58] Field of Search ................... 83/69, 88, 91, 155, 83/155.1, 92, 79, 89; 198/21

[56] References Cited
UNITED STATES PATENTS

3,133,574   5/1964   Reichel et al. ........................... 83/69
3,835,742   9/1974   Spooner ............................. 83/91 X Primary Examiner—Willie G. Abercrombie
Attorney, Agent, or Firm—Lockwood, Dewey, Zickert & Alex

[57] ABSTRACT

A system for loading a continuously moving conveyor belt comprises a slicer for producing bacon strips from a bacon slab, a conveyor for conveying bacon strips from the slicer, and a transfer station for transferring bacon strips from a serial arrangement on the conveyor to a side-by-side arrangement of spaced transverse rows on the continuously moving conveyor belt. A novel control system is provided to coordinate the operation of the slicer and the transfer station to obtain a continuous and uniform loading of the conveyor belt and to avoid the production of partial or deformed bacon strips by the slicer. The loading system is particularly well adapted to loading unfried bacon strips onto the conveyor of a bacon frying oven.

8 Claims, 8 Drawing Figures

CONVEYOR LOADING SYSTEM

This is a division of application Ser. No. 447,392, filed Mar. 1, 1974, now U.S. Pat. No. 3,941,234.

BACKGROUND OF THE INVENTION

The present invention relates generally to transfer systems, and more specifically to a loading system for loading strip-like products such as sliced bacon onto a unidirectionally driven conveyor in evenly-spaced transverse rows. The system finds particular utility for loading bacon strips sliced from a bacon slab onto the endless conveyor of a bacon frying oven.

Bacon frying ovens of the type to which the present invention is particularly adapted employ a wide continuously moving conveyor belt on which bacon strips are arranged side-by-side in transverse rows. As the bacon strips progress through the oven a second continuously moving belt is brought down on top of the bacon slices. The two belts, with the bacon strips pressed flat inbetween, are driven between heated platens which simultaneously apply pressure and heat to fry the bacon strips. After the bacon strips have been fried the second belt is removed to enable the bacon strips to be removed from the conveyor belt.

For efficient operation of such bacon frying ovens it is necessary that the bacon strips be arranged to provide maximum utilization of the conveyor belt surface. That is, the bacon strips must not be so close together as to stick together during the frying operation, or so far apart as to cause large areas of the belts to be heated and pressed with no bacon strips therebetween. Accordingly, it has become standard practice to arrange the bacon strips lengthwise side-by-side in transverse rows extending across the entire width of the belt, the transverse rows being equally spaced along the entire length of the top surface of the conveyor belt. Furthermore, since the oven platens must necessarily be continuously heated and short term temperature changes are not practicable, it is highly desirable for consistent frying action that the fryer oven conveyor move continuously at a predetermined constant speed.

The need for loading and offloading bacon strips from the oven conveyor without interfering with the operational efficiency of the oven, or with the operating efficiency of up-line and down-line processing machinery utilized to process the bacon strips, has presented a need for loading and unloading systems capable of automatically handling the thin limp strips of bacon with a high degree of precision. The co-pending application of the present inventors, Ser. No. 447,354, filed Mar. 1, 1974 and assigned to the present assignee, now U.S. Pat. No. 3,941,234, is directed to a system meeting these criteria which is eminently well suited for unloading fried bacon slices from the oven conveyor, and the present application is directed to a system meeting these criteria for loading limp unfried bacon strips sliced from a bacon slab onto the conveyor. This system effectively coordinates the bacon slicing operation with the loading operation to achieve an efficient continuous loading of the oven, and to avoid the loading of partial or deformed bacon strips which would not be marketable, and therefore wasteful of valuable space on the oven conveyor.

Accordingly, it is a general object of the present invention to provide a new and improved loading system for arranging items side-by-side in equally spaced transverse rows on a continuously driven belt conveyor.

It is another object of the present invention to provide a new and improved loading system for loading bacon strips or slices onto the continuously moving conveyor of a bacon frying oven.

It is another object of the present invention to provide a new and improved loading system for transferring bacon strips from a serial or single file arrangement on a first conveyor belt to a side-by-side arrangement of transverse equally-spaced rows on a second continuously moving conveyor.

It is another object of the present invention to provide a new and improved system for slicing bacon strips from a bacon slab and for loading the bacon strips onto a continuously moving conveyor belt.

It is another object of the present invention to provide a new and improved system for slicing bacon strips from a bacon slab and for loading the bacon strips in uniformly spaced transverse rows onto the continuously moving conveyor belt of a bacon frying oven which provides less waste and which does not interfere with the efficiency of the oven.

SUMMARY OF THE INVENTION

The invention is directed to a system for loading a finite number of items from a first unidirectionally driven conveyor onto a second conveyor aligned at right angles to the first conveyor. The system comprises a carriage loading platform comprising a plurality of parallel spaced-apart cantilevered conveyor belts arranged at the discharge end of the first conveyor and unidirectionally driven to form a contiguous path therewith for the items, and a transfer carriage comprising a plurality of parallel spaced-apart cantilevered support members anchored to a carriage support block at one end, the support members being arranged in a plane and spaced so as to pass between respective ones of the cantilevered conveyor belts. The system further comprises a carriage offloading platform comprising a plurality of parallel spaced-apart cantilevered support rods arranged at the input end of the second conveyor to form a contiguous path therewith for the items, at least a portion of the rods being rotatably driven so as to move the items from a predetermined offloading position onto the second conveyor, and carriage actuator means responsive to the presence of the items on the first conveyor for cycling the transfer carriage along an operating path whereby the support members are caused to successively pass between the cantilevered support belts of the carriage loading platform and the cantilevered support rods of the carriage offloading platform while being maintained in a substantially horizontal plane to transfer the items from the carriage loading platform to the carriage offloading platform.

The invention is further directed to a system for loading a finite number of bacon strips, sliced from a bacon slab by a bacon slicer having a cyclically operative slicing blade, side-by-side in transverse rows on a continuously moving conveyor. The system comprises a unidirectionally driven conveyor for conveying the bacon strips away from the slicer, a cyclically operative transfer carriage for removing the finite number of bacon slices from the conveyor, and a counter responsive to the slicer having completed an operating cycle for maintaining a cumulative count of the number of cycles completed by the slicer, and for producing an output signal upon reading a predetermined count. The system further comprises product feed control means operatively associated with the slicer for controlling the feed of the bacon slab to the slicing blade to selectively initiate and terminate the production of bacon slices by said slicer, and slicer control means responsive to the initiation of a transfer cycle by the transfer carriage for resetting the counter and for conditioning the product feed control means to initiate production of bacon strips by the slicer as the slicing blade next passes between operating cycles, and further responsive to the output signal from the counter for conditioning the product feed control means to terminate production of bacon strips by the slicer when the finite number of bacon strips have been produced.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figures 1, 3:
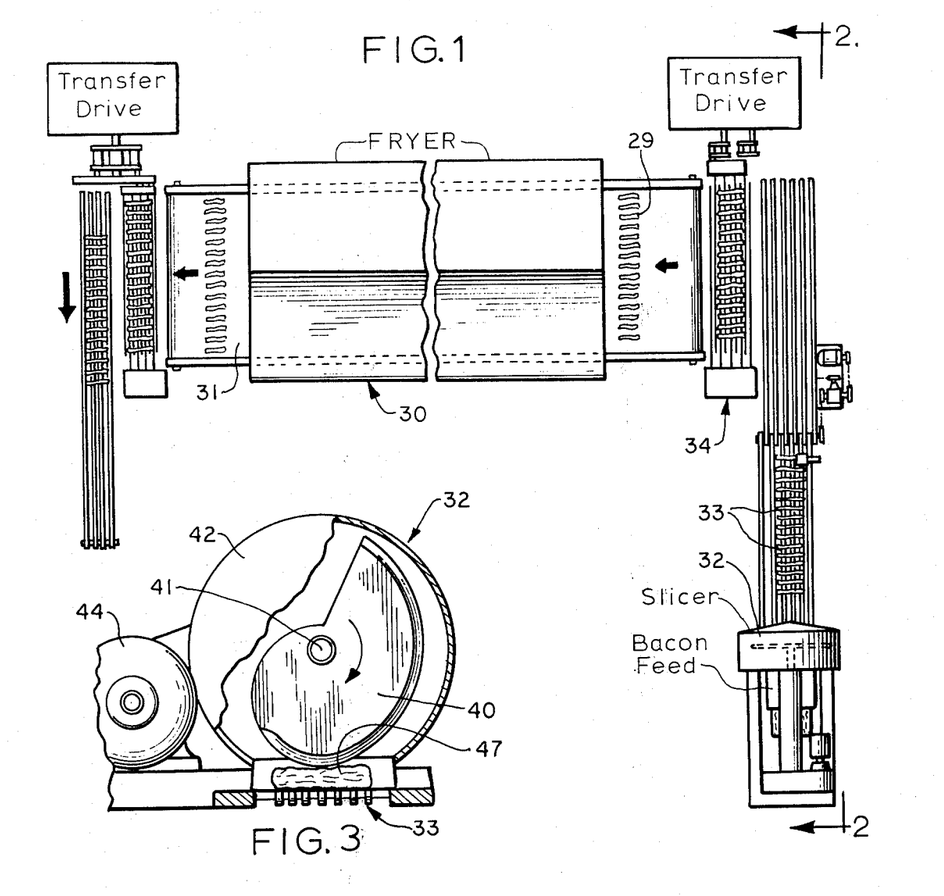
FIG. 1 is a top plan view, partially diagrammatic, of a bacon frying oven and the loading and offloading systems associated therewith.
FIG. 3 is a side elevational view taken along line 3—3 of FIG. 2, showing one side of the bacon slicer employed in the loading system partially broken away to show the bacon slicing blade incorporated therein.

Referring to FIG. 1, a loading system constructed in accordance with the invention is shown in connection with a bacon frying oven 30, which may be conventional in design and construction. Basically, oven 30 comprises a horizontal continuous conveyor belt 31 which is unidirectionally driven to transport bacon strips 29 through the oven. To facilitate this function, the conveyor belt 31 may be coated with Teflon or have a similar non-adhesive surface to prevent the bacon strips from sticking to the belt. A second unidirectionally driven continuous conveyor belt (not shown) is brought into engagement with belt 31 within the bacon fryer oven to press the bacon strips flat during the frying operation. While the bacon strips are being held flat between the two conveyor belts the belts pass between heated platens (not shown) which simultaneously apply heat and pressure to fry the bacon. As shown in FIG. 1, the loading system associated with oven 30 includes a bacon slicer 32, a unidirectionally driven conveyor 33 for conveying the bacon slices from the slicer 32, and a product transfer station 34 for transferring the bacon slices from a serial arrangement on conveyor 33 to a side-by-side arrangement of equispaced transverse rows on the oven conveyor belt 31.

Figure 2:
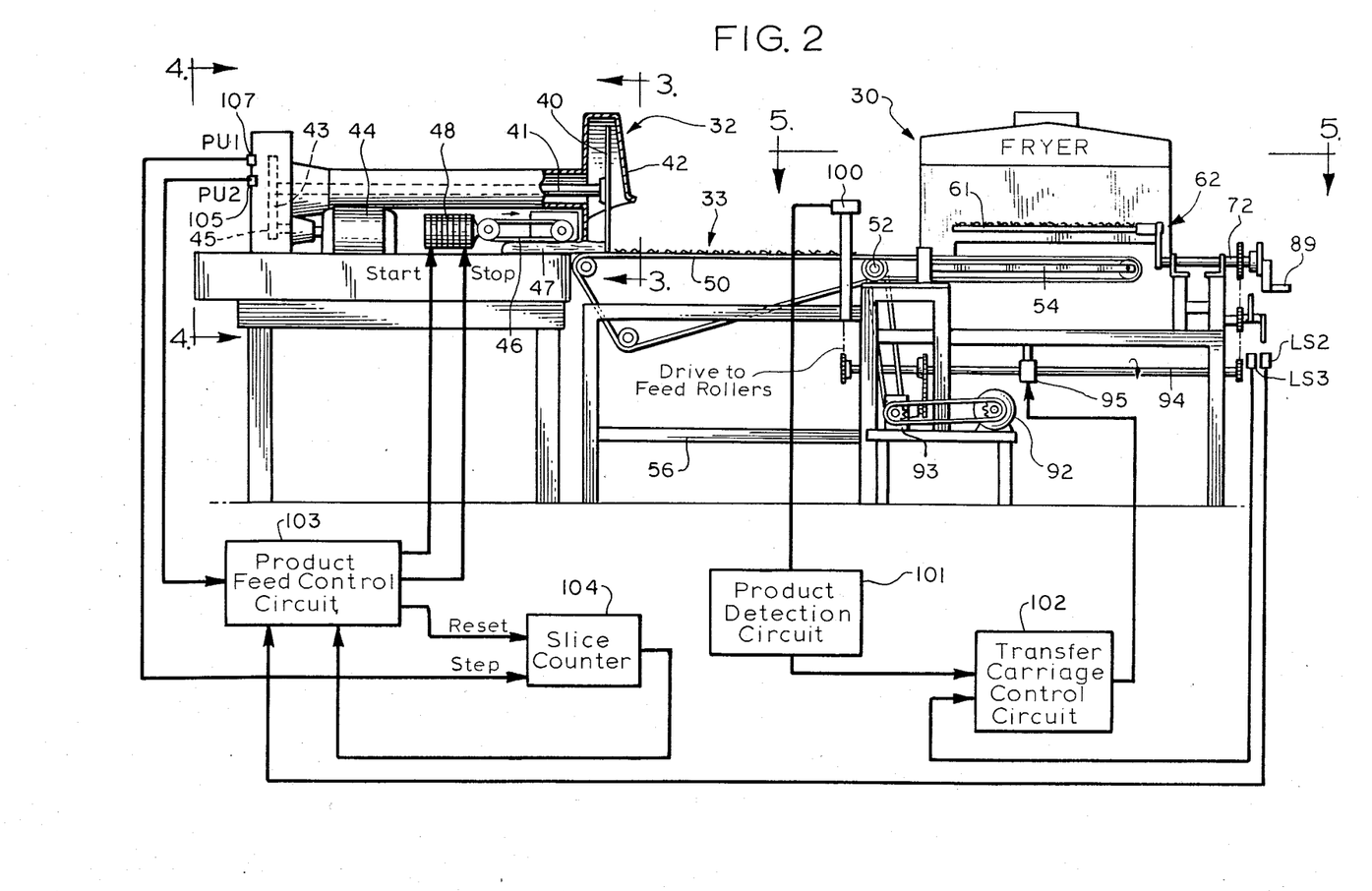
FIG. 2 is a side elevational view, partially in functional block form, taken along line 2—2 of FIG. 1 showing a loading systen constructed in accordance with the invention associated with the bacon frying oven of FIG. 1.
Figure 4:
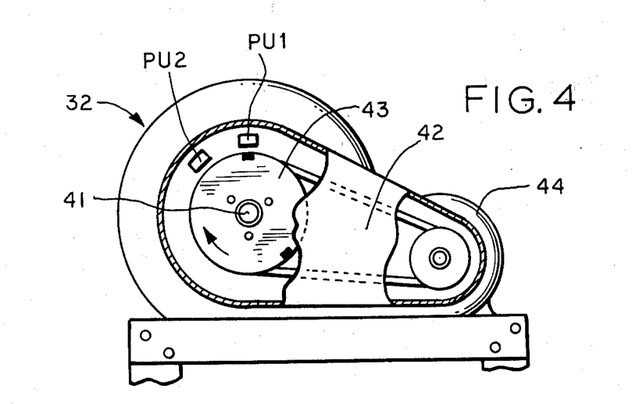
FIG. 4 is a front elevational view taken along line 4—4 of FIG. 2 showing the other side of the bacon slicer partially broken away to show the drive arrangement for the bacon slicing blade incorporated therein.

Referring to FIGS. 2–4, bacon slicer 32, which may be conventional in design and construction, comprises a thin rotary cutting blade 40 having a circumferential spiral cutting edge of progressively increasing diameter. The cutting blade 40 is carried on one end of a horizontal drive shaft 41, and the entire assembly is enclosed within a housing 42. A fly wheel 43 is carried on the other end of drive shaft 41, and the fly wheel 43, drive shaft 41, and cutting blade 40 are rotatably driven by means of an electric motor 44 rotatably coupled to the fly wheel by a belt 45 or other suitable means. A carriage 46 is provided beneath drive shaft 41 to receive a bacon slab 47 from which bacon strips are to be cut. In practice, a plurality of such bacon slabs may be arranged end to end on conveyor 46, the leading end of the front slab, i.e. that closest to blade 40, being brought to bear against the inside surface of the rotary cutting blade 40. The rate and pressure with which the leading end of the leading bacon slab is brought into contact with blade 40 are controlled by a hydraulic motor 48, which serves as a power source for the bacon slab conveyor 46.

In operation, the leading bacon slab 47 on conveyor 46 is fed against the rear or inside surface of blade 40 by hydraulic motor 48 at a rate and with a pressure which causes a single slice of bacon of uniform thickness to be sliced from the slab with each complete rotation of the blade 40. The blade 40 rotates continuously at high speed, cutting action being stopped by the operator when necessary by removing hydraulic pressure from the hydraulic feed motor 48. The fly wheel 45 supplies sufficient inertia to insure that the cutting knife will rotate at a constant velocity throughout its operating cycle.

Each strip of bacon 29 cut from bacon slab 47 falls onto conveyor 33 in transverse alignment, the motion of the conveyor 33 obtaining a uniform spacing between successive strips. To this end, conveyor 33 comprises six parallel spaced-apart belts 50 arranged immediately below the cutting area. The conveyor belts are unidirectionally driven so as to transport the bacon strips away from the slicing station 32 and toward the product transfer station 34.

Figure 5:
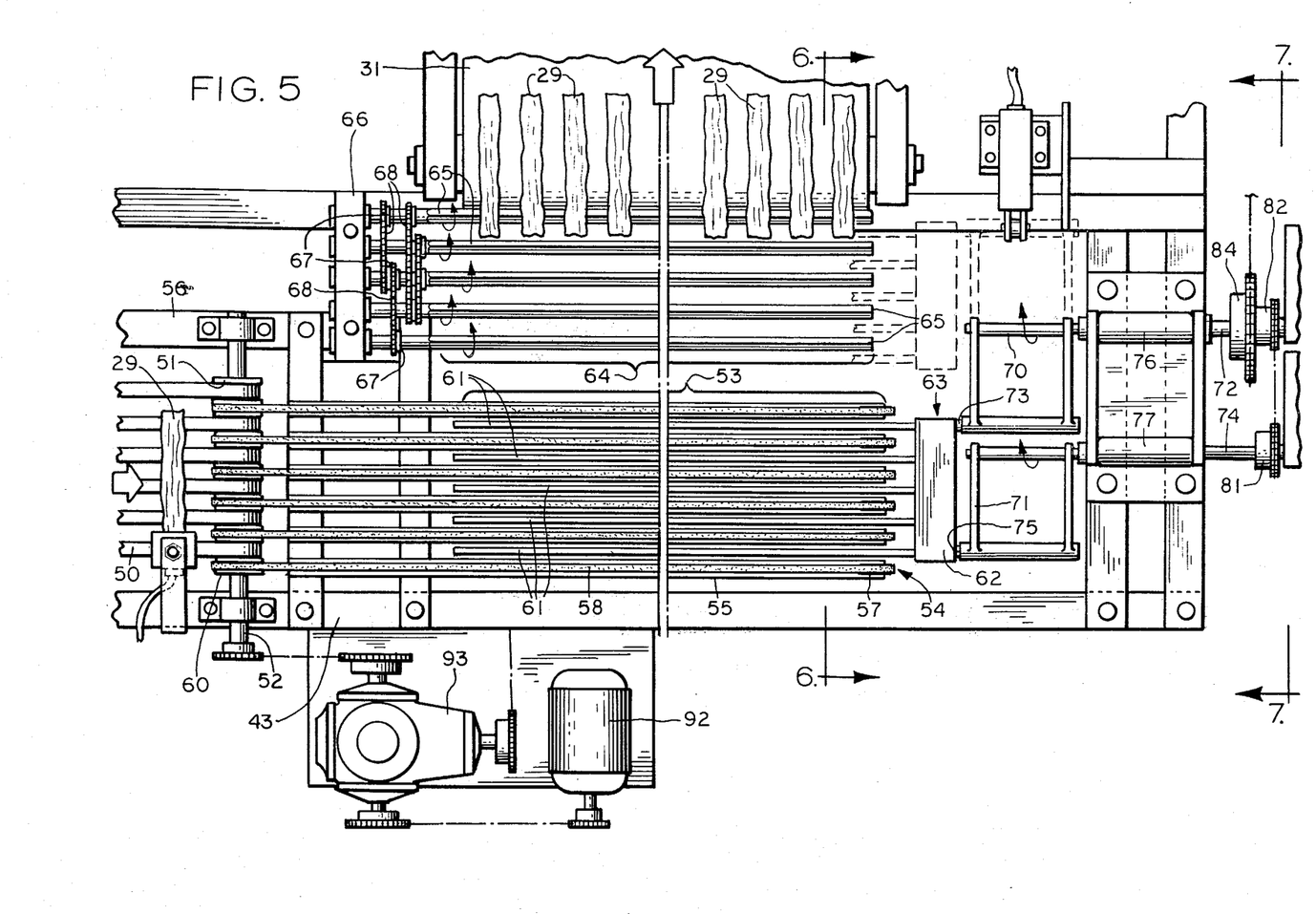
FIG. 5 is an enlarged top plan view taken along line 5—5 of FIG. 2 showing the product transfer station incorporated in the loading system for transferring bacon slices from a transfer conveyor to the oven conveyor.

Referring to FIGS. 1 and 5, conveyor 33 ends at the product transfer station 34, the six belts 50 of the conveyor 33 reversing direction around respective ones of six end pulleys 51 carried on a horizontal transversely aligned conveyor drive shaft 52. At this point the bacon strips are transferred to a carriage loading platform 53, which is formed by six parallel spaced-apart cantilevered conveyor belt assemblies 54. Each of these conveyor belt assemblies 54 comprises a cantilevered support beam 55 which is attached at one end to the frame 56 of the transfer apparatus, and which is bifurcated at its other end to support a pulley 57. A conveyor belt or tape 58 is received over each pulley 57 and extends along the top edges of its support beam 55 to an end pulley 60 carried on the conveyor drive shaft 52. Since shaft 52 serves as an end shaft for both the six conveyor belts of conveyor 33 and the six conveyor belt assemblies 54, a contiguous transfer surface is formed for the bacon strips 29 from slicer 32.

The cantilevered belt assemblies 54 of the carriage loading station 53 are spaced so as to allow five parallel spaced-apart cantilevered rod-like product support members 61 to fit therebetween. Support members 61 are arranged in a horizontal plane and are attached at one end to a carriage support block 62 to form a product transfer carriage 63 for lifting bacon strips from the carriage loading platform 53.

To receive the bacon strips from the product transfer carriage 63, the transfer station 34 includes a carriage off-loading platform 64. This platform comprises five rotatably driven six-sided product support rods 65 which are arranged in a horizontal plane and cantilevered at one end to a support block 66. These rods are rotatably driven at equal angular speeds by means of sprockets 67 carried on the supported ends and a pair of drive chains 68 to urge bacon strips deposited on the carriage offloading platform 64 by transfer carriage 63 onto the oven conveyor 31.

To transfer bacon strips from the carriage loading station 53 to the carriage offloading station 64, the product transfer carriage 63 is constrained to operate along a circular operating path whereby product support members 61 successively pass between the cantilevered conveyor belt assemblies 54 of the carriage loading platform 53 and the rotatably driven product support rods 65 of the offloading platform 64. To this end, the carriage support block 62 is mounted to the machine frame 56 by means of an articulated quadrilateral four-bar linkage found by a pair of crankarms 70 and 71. For greater resistance against tortional forces, the crankarms 70 and 71 are boxlike in structure, crank arm 70 receiving a drive shaft 72 along one side and a crank pin 73 from carriage block 62 along its other side; and crank arm 71 receiving a drive shaft 74 along one side and a crank pin 75 from carriage block 62 along its other side. Drive shafts 72 and 74 are journaled to frame 66 by journal blocks 76 and 77, respectively.

Figure 6:
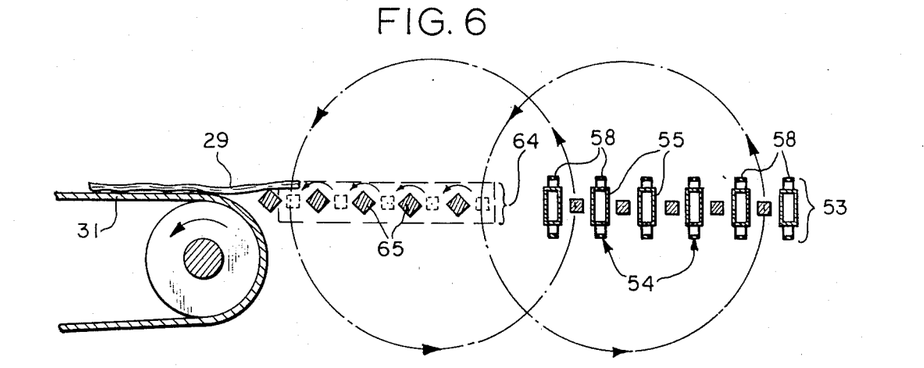
FIG. 6 is a diagrammatic sectional view taken along line 6—6 of FIG. 5 depicting the operation of the product transfer station.
Figure 7:
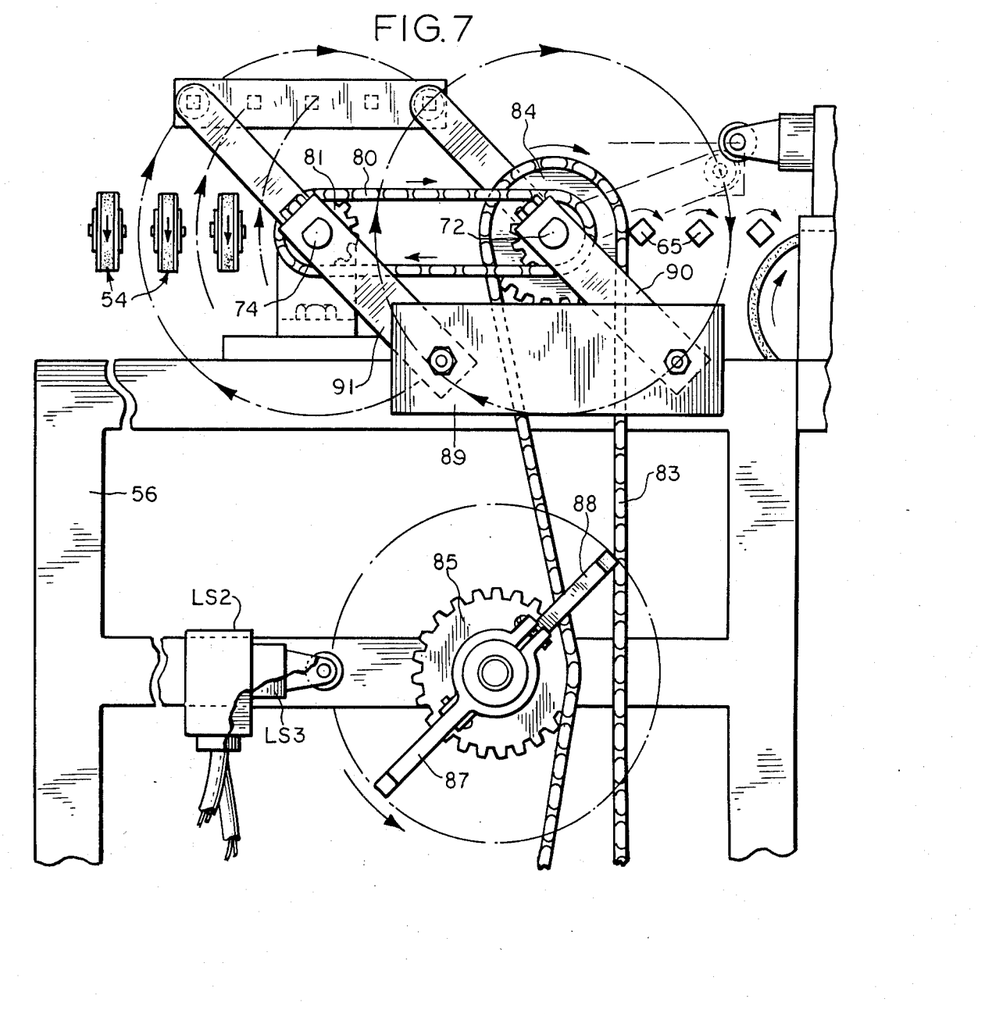
FIG. 7 is an enlarged cross-sectional view taken along line 7—7 of FIG. 5 showing the drive linkage employed for driving the product transfer carriage.

The operating path of the product transfer carriage 63 is shown diagrammatically in FIG. 6, the individual support members 61 being seen to successively pass between the cantilevered conveyor belt assemblies 54 of the carriage loading platform and the rotatably driven support rods 65 of the carriage offloading platform 64 while being maintained in a horizontal plane. The product transfer carriage 63 is moved along this operating path by simultaneously applying drive power to shafts 72 and 74. Referring to FIG. 7, this simultaneous application of drive power is accomplished by means of a chain belt 80 which rotatably couples sprockets 81 and 82 on the two shafts and a chain belt 83 which couples a sprocket 84 on shaft 72 to a source of rotational power. Chain belt 83 also engages a follower sprocket gear 85 rotatably mounted on the machine frame 56. Gear 85 drives a shaft 86 to which a pair of limit switch actuator arms 87 and 88 are carried. As will be seen presently, these actuator arms can be positioned so as to actuate respective ones of limit switches LS2 and LS3 as the product transfer carriage proceeds through its operating cycle.

To offset the weight of the product transfer carriage 63 a counterweight 89 may be carried on drive shafts 72 and 74 by means of a pair of radially-extending arms 91. Referring again to FIG. 2, drive power is obtained for product transfer station 34 from an electric motor 92. Motor 92 is coupled through a right angle drive 93 to a longitudinally extending shaft 94, which drives chain 83 through an electrically controlled clutch 95.

To accomplish the aforedescribed loading of the oven conveyor 31 with maximum accuracy and efficiency, and with minimum waste, the loading system of the present invention incorporates a novel control system for coordinating the operation of the bacon slicer 32 and the product transfer station 34. Referring to FIG. 2, assuming carriage 62 is at rest at the home position shown in FIG. 5, the presence of bacon strips on conveyor 33 is sensed at a predetermined location along that conveyor by means of a product detector 100 in the form of photocell PC and cooperating light source (not shown). The lead bacon strip, when sensed by photocell PC, causes an electrical control signal to be generated within product detector circuit 101, which may be a conventional photodetector amplifier circuit. This control signal is applied to a transfer carriage control circuit 102, which generates a control signal to clutch 95 which causes the clutch to rotatably couple the carriage drive shaft 94 to the carriage drive motor 92. As a result, the product transfer carriage 62 moves from its home position through one complete transfer cycle, transferring the bacon strip group which was sensed by photodetector PC (which was conveyed onto loading platform 53 in the interim time required for carriage 62 to advance from its home position to the loading platform 53). The product transfer carriage 62 continues through its cycle until it returns to the home position, as detected by limit switch LS3. When this switch is actuated, the transfer carriage control circuit 102 causes clutch 95 to be disengaged and carriage drive shaft 94 to be braked so as to hold the transfer carriage 62 in its home position. It will be appreciated that the speed of conveyor 33 and the cantilevered conveyor assemblies 54 of the carriage loading platform 64 is such that the group of bacon strips detected by product detector 100 (photodetector PC) will have proceeded to the loading platform 64 by the time the product support members 61 of the product transfer carriage 62 pass therethrough. In the present embodiment this speed control is facilitated by operating the transfer carriage 62 and the two conveyors 33 and 54 from the same motor 92.

In accordance with the invention, the cycling of the transfer carriage initiates a slicing cycle in slicer 32. That is, as transfer carriage 62 completes its cycle a limit switch LS2 is actuated. This conditions a product feed control circuit 103 to simultaneously initiate a start signal to the hydraulic feed motor 48 and reset a slice counter 104. However, product feed control circuit 103 accomplishes neither of these functions until the slicer blade 40 has rotated to a reference position immediately preceding its next cutting cycle. This is detected by means of a pickup 105 associated with the slicer blade fly wheel 43, which may comprise a reed switch PU2 responsive to the passage of a first circumferentially positioned magnetic actuator 106 on the flywheel 43 or another type of position detector such as a magnetic coil.

Once pickup 105 (PU2) has detected the beginning of a slicing cycle, product feed control circuit 103 conditions the hydraulic product feed motor 48 to start feeding bacon slabs 47 into the slicing blade and resets slice counter 104 to a zero counting state. Henceforth, each rotation of the slicer blade 40 is detected by a second pickup 107 associated with fly wheel 43, which may comprise a magnetic coil PU 1, responsive to the passage of a second circumferentially positioned magnetic actuator 108 on the fly wheel 43, or another type of position detector such as a reed switch. Each rotation causes slice counter 104 to be stepped one count. The slicer blade 40 continues to rotate and the bacon slab 47 continues to be fed into the blade until the desired number of bacon slices have been cut, as determined by a predetermined counting state being obtained in counter 104. At this time slice counter 104 produces an output signal which is applied to the product feed control circuit 103 to condition these circuits to stop the hydraulic product feed motor 48. The feeding of the bacon slab 47 into the slicing blade 40 is immediately stopped, and the group of sliced bacon strips 29 advances along conveyor 33 until the lead bacon strip eventually reaches the product detector 100 (PC), at which point the aforedescribed transfer cycle of product transfer station 34 is initiated. This in turn initiates another bacon slicing cycle, so that an uninterrupted flow of groups of bacon slices spaced side-by-side along conveyor 33 for loading onto oven conveyor 31 is obtained. Since only complete slicing cycles are possible, the slicer being prevented from slicing partial slices, no partial bacon slices, or so-called short slices, are loaded onto the oven conveyor 31. This obviates the need to station an observer at the oven conveyor to watch for such short slices and replace them with complete slices, as has been necessary with prior art loading systems. Furthermore, since the conveyance of each group of bacon strips is carefully controlled with respect to the operation of the product transfer conveyor, it is possible to obtain a high degree of accuracy in the placement of the bacon strips on the oven conveyor 31. This allows the end strips in each transverse row on conveyor 31 to be positioned closer to the edge of the conveyor, thereby allowing placement of more strips in each row and greater utilization of the frying oven 30 than was possible with prior art oven loading systems.

Figure 8:
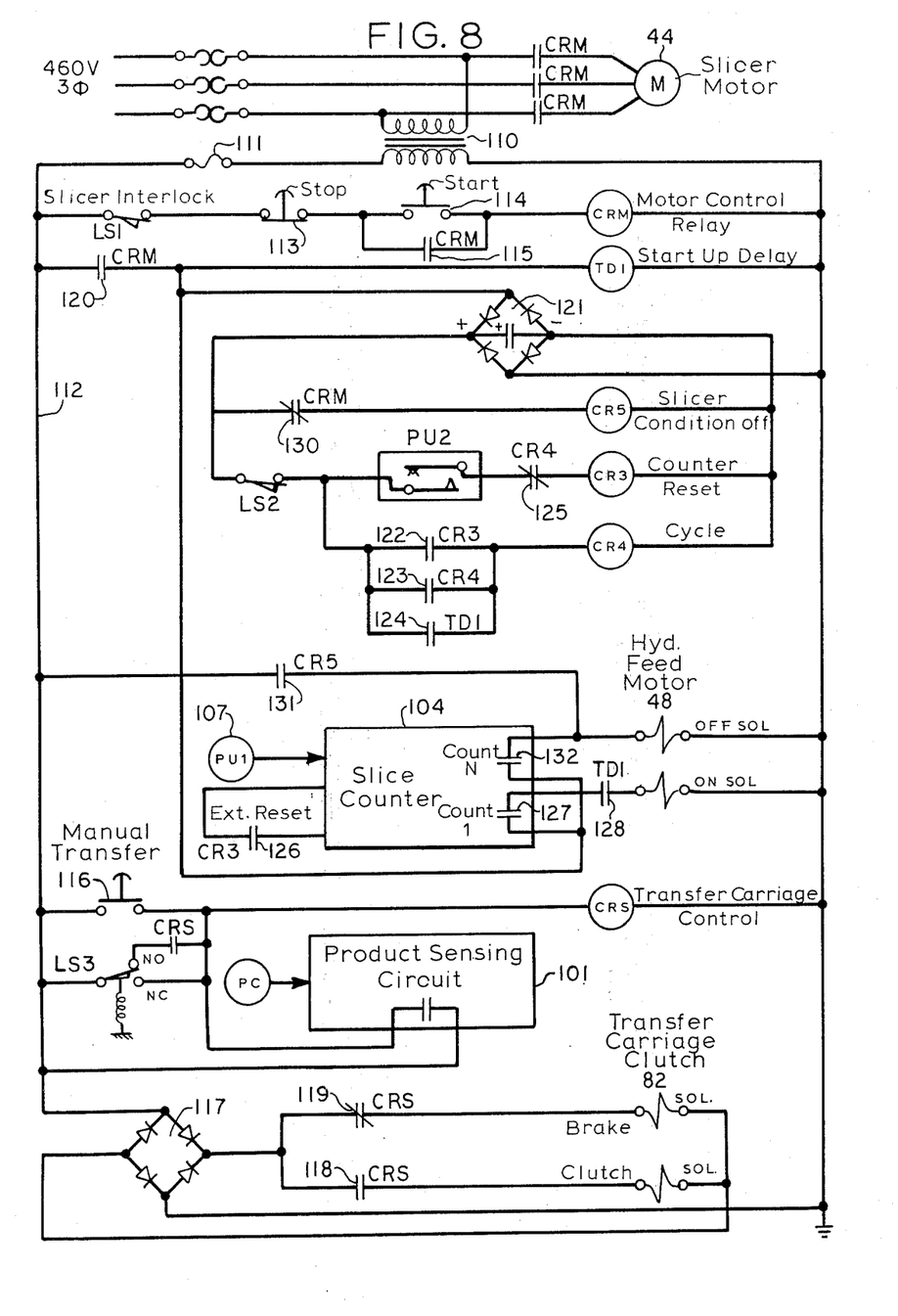
FIG. 8 is a simplified schematic diagram of the electrical control circuitry employed in the loading system of the present invention.

A simplified schematic diagram of the electrical control circuitry employed in the illustrated embodiment of the invention is shown in FIG. 8. The slicer motor 44 is powered from a 460 volt three-phase power source by way of individual contact sections of a power control relay CRM. Two legs of the three phase power source are connected to the primary winding of the step-down transformer 110. The secondary winding of this transformer is connected through a fuse 111 to a supply bus 112 which supplies AC current for the control circuits of the loading system, and the other terminal is grounded. The supply bus 112 is connected through a normally-closed slicer interlock switch LS1, a normally-closed STOP push button switch 113 and a normally-open START push button switch 114 to the motor control relay CRM. A pair of normally-open contacts 115 of relay CRM are shunt-connected across START push button 114 to provide a holding circuit for the motor control relay. To place the slicer in operation, it is necessary to have the slicer housing closed so that limit switch LS1 will be closed. The slicer motor 44 can then be started by momentarily depressing START push button 114, which energizes motor control relay CRM and closes the associated holding contacts 115. Relay CRM is maintained energized by contacts 115 until the STOP push button 113 is subsequently depressed.

The operation of the product transfer carriage 62 can be manually controlled by momentary actuation of a MANUAL TRANSFER push button 116. This causes a carriage control relay CRS to be actuated, which in turn causes direct current obtained from a bridge rectifier 117 to be applied through contacts 118 of relay CRS to the clutch control solenoid of the transfer carriage clutch 95, and direct current to be removed through normally-closed contacts 119 of relay CRS from the brake control solenoid of that clutch. Relay CRS can also be actuated automatically by product detection circuit 101, which it will be recalled detects the passage of bacon strips at photodetector PC. Once the carriage transfer cycle has been initiated, the spring-biased limit switch LS3 is urged into a closed condition to maintain relay CRS energized until the transfer carriage again returns to its home position. At this point, limit switch LS3 is forced open, and absent another start command from either the MANUAL TRANSFER push button switch 116 or the product sensing circuit 101 the carriage remains in its home position.

The cycling of transfer carriage 62 also causes the momentary opening of limit switch LS2. Since motor control relay CRM is closed during operation of the system, contacts 120 of relay CRM are closed and power is supplied to a bridge rectifier network 121. This network supplies direct current through normally-closed limit switch LS2 to relay CR4 by way of the parallel-connected contacts 122 of relay CR3, 123 of relay CR4, and 124 of time delay relay TD1. The initial closure of contacts 120 causes the time delay relay TD1 to be actuated only after a momentary delay. This causes contacts 124 to be initially closed for a short period of time, so that relay CR4 will normally be energized at this time. Contacts 123 provide a holding circuit so that once relay CR4 has been energized, it remains energized. Thus, relay CR4 is energized upon initial operation of slicer motor 44, and remains energized until limit switch LS2 is subsequently actuated by the cycling of carriage 62.

It will be recalled that the slicer blade 40 is continuously driven and that it periodically passes through an interim or reference position immediately preceding its next cutting cycle. As the cutter blade 40 passes through this reference position it will also be recalled that pickup 105 (PU2) is momentary actuated by appropriate magnetic means on the cutter blade fly wheel 43. The momentary actuation of reed switch PU2 causes the counter reset relay CR3 to be actuated through the normally-closed contacts 125 of relay CR4, provided that relay CR4 has been previously de-energized. Since this can happen only if limit switch LS2 has been first actuated, it follows that relay CR3 will be actuated only when the cutter blade arrives at its reference position after the transfer carriage 62 has begun a transfer cycle. Energization of the counter reset relay CR3 closes contacts 122, which actuates relay CR4. This in turn opens contacts 125 to prevent relay CR3 from being again actuated during the succeeding cutting cycles prior to the slice counter 104 reaching its predetermined maximum count.

The energization of relay CR3 causes contacts 126 to be momentarily closed, thereby resetting slice counter 104. Counter 104 is stepped by output pulses from pickup 107 (PU1), which it will be recalled comprises a magnetic pickup coil located immediately adjacent fly wheel 43 to record the completion of each slicing cycle, i.e. each complete rotation of slicer blade 40. Upon the completion of the first slicing cycle, contacts 127 in slice counter 104 close to apply power through the normally-open contacts 128 of relay TD1 to the ON control solenoid of the hydraulic feed motor 48. Contacts 128 of relay TD1 are closed at this time, providing a sufficient delay has occurred to allow the time delay relay TD1 to have been energized following the closure of contacts 120 of relay CRM.

The closure of contacts 120 is followed with a slight overlap by the opening of normally-closed contacts 130, thereby obtaining momentary energization of relay CR5 each time relay CRM is energized. This causes the hydraulic feed motor 48 to be initially conditioned off through the normally-open contacts 131 of CR5 upon each start of the slicer motor.

Upon completion of a predetermined number of counts, ordinarily corresponding to one greater than the number of bacon slices to be arranged side-by-side in each row across the bacon fryer conveyor 31 (the first count recorded by slice counter 104 not corresponding to the production of a bacon slice because of hydraulic feed motor 48 being initially conditioned off), contacts 132 of slice counter 104 close and the off control solenoid of the hydraulic feed motor 48 is momentarily energized. This terminates slicing, since as of that time the bacon slab 47 will no longer be fed into engagement with the slicer blade 40. However, the slicer blade 40 continues to rotate in anticipation of another cutting cycle, which will be initiated only upon actuation of limit switch LS2 by cycling of the product transfer carriage 62.

Thus, a novel loading system has been shown for slicing strips of bacon and arranging the bacon strips on the continuously moving conveyor of a bacon frying oven. The process is continuous and accurate and is accomplished with minimum waste. The placement of the bacon strips is maintained to a high degree of accuracy for optimum efficiency in the operation of the bacon frying oven, and by reason of the consistency of the slicing action the need for additional inspection and manual replacement of defective or short bacon slices is obviated. The system makes use of conventional material handling equipment to a large extent, and is simple and reliable in operation.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A system for loading a finite number of bacon strips, sliced from a bacon slab by a bacon slicer having a cyclically operative slicing blade, side-by-side in transverse rows on a continuously moving conveyor, said system comprising, in combination:

a unidirectionally driven conveyor for conveying said bacon strips away from said slicer;

a cyclically operative transfer carriage for removing said finite number of bacon slices from said conveyor;

a counter responsive to said slicer having completed an operating cycle for maintaining a cumulative count of the number of cycles completed by said slicer, and for producing an output signal upon reaching a predetermined count;

product feed control means operatively associated with said slicer for controlling the feed of said bacon slab to said slicing blade to selectively initiate and terminate the production of bacon slicers by said slicer; and slicer control means responsive to the initiation of a transfer cycle by said transfer carriage for resetting said counter and for conditioning said product feed control means to initiate production of bacon strips by said slicer as said slicing blade next passes between operating cycles, and further responsive to the output signal from said counter for conditioning said product feed control means to terminate production of bacon strips by said slicer when said finite number of bacon strips have been produced.

2. A loading system as defined in claim 1 wherein said transfer carriage transfers said finite number of bacon strips from said unidirectionally driven conveyor to said continuously moving conveyor during each operating cycle of said carriage.

3. A loading system as defined in claim 2 wherein said slicer control means conditions said product feed control means to initiate production of bacon strips only after said slicing blade has completed one complete cycle following the initiation of a transfer cycle by said transfer carriage.

4. A loading system as defined in claim 3 wherein said counter produces an output after reaching a count one greater than said finite number.

5. A loading system as defined in claim 1 wherein said transfer carriage remains in a home position when not being cycled, and wherein means including a product detector are positioned at a predetermined location along said unidirectionally driven conveyor for initiating said transfer cycle.

6. A loading system as defined in claim 5 wherein said transfer carriage receives said finite number of items from said unidirectionally driven conveyor at a carriage loading platform contiguous to said unidirectionally-driven conveyor, and wherein the time required for said finite number of bacon strips to advance from said predetermined location to said carriage loading platform is substantially equal to the time required for said transfer carriage to advance from said home position to said carriage loading platform.

7. A loading system as defined in claim 1 wherein said slicer has a rotatably driven slicing blade, wherein a first detector responsive to the angular position of said blade is provided for producing a first output signal indicative of said slicing blade passing between cycles, and wherein a second detector responsive to the angular position of said slicing blade is provided for producing a second output signal indicative of said slicing blade having completed a slicing cycle.

8. A loading system as defined in claim 7 which further includes means responsive to the position of said transfer carriage for producing a third output signal, and wherein said counter is responsive to said second output signal and said slicer control means are responsive to said first and third output signals.

* * * * *